(12) United States Patent
Mar

(10) Patent No.: US 9,740,084 B1
(45) Date of Patent: Aug. 22, 2017

(54) ANGLED MOUNTING STRUCTURE FOR A VIDEO CAMERA DOORBELL ASSEMBLY

(71) Applicant: Christopher E. Mar, Leesburg, VA (US)

(72) Inventor: Christopher E. Mar, Leesburg, VA (US)

( * ) Notice: Subject to any disclaimer, the term of this patent is extended or adjusted under 35 U.S.C. 154(b) by 0 days.

(21) Appl. No.: 15/356,803

(22) Filed: Nov. 21, 2016

(51) Int. Cl.
G03B 17/56 (2006.01)
G03B 29/00 (2006.01)
F16M 13/02 (2006.01)

(52) U.S. Cl.
CPC .......... *G03B 17/561* (2013.01); *F16M 13/02* (2013.01); *G03B 29/00* (2013.01)

(58) Field of Classification Search
None
See application file for complete search history.

(56) References Cited

U.S. PATENT DOCUMENTS

| 4,870,440 | A | * | 9/1989 | Frost | F16M 13/02 248/188.2 |
| 4,899,189 | A | * | 2/1990 | Frost | F16M 11/16 248/163.1 |
| 5,249,767 | A | * | 10/1993 | Mellen | F16M 7/00 248/188.2 |
| 6,392,704 | B1 | * | 5/2002 | Garcia-Ortiz | G08B 13/19619 340/937 |
| 7,262,789 | B2 | * | 8/2007 | Jones | F41H 11/00 348/143 |
| 2016/0115978 | A1 | * | 4/2016 | Buchanan | F16B 2/22 248/122.1 |
| 2016/0216595 | A1 | * | 7/2016 | Carlson | G03B 17/02 |

* cited by examiner

*Primary Examiner* — Wib Perkey
(74) *Attorney, Agent, or Firm* — Eugene Mar

(57) ABSTRACT

An angled mounting structure for expanding the field of view of a video camera doorbell assembly. A back surface is provided for mounting the structure to the frame of a doorway. A front surface is provided for mounting the video camera doorbell assembly. A center portion of the structure has accommodating space for wiring. The back and front surfaces are non-parallel and define planes which converge in a forward direction and diverge in a rearward direction.

4 Claims, 4 Drawing Sheets

ANGLED MOUNTING STRUCTURE FOR A VIDEO CAMERA DOORBELL ASSEMBLY

BACKGROUND OF THE INVENTION

Field of the Invention

The present invention relates to a known video camera doorbell assembly, and in particular to an angled mounting structure for a video camera doorbell assembly.

Description of Prior Art

Video camera doorbell assemblies capture images of visitors in front of doors. The conventional video camera doorbell assembly mount has a mounting surface that is parallel with the door.

However, many video camera doorbell assemblies are installed perpendicular to the door. This reduces the viewing angle of the camera and the effectiveness of the video camera doorbell assembly to capture images of visitors. Therefore, it is an important aspect of the present invention to solve this problem.

SUMMARY OF THE INVENTION

The present invention is to provide an angled mounting structure for a video camera doorbell assembly, whereby the effectiveness of the video camera doorbell assembly is improved.

The present invention provides an angled mounting structure for a video camera doorbell assembly with holes for mounting to existing surfaces, a slot for tool access to mounting holes. A slot for wiring pass through and a chamber for accommodating excess wiring.

The present invention improves the effectiveness of video camera doorbell assemblies by reducing the angle between the door and video doorbell assembly.

In comparison with prior art, the present invention has advantageous features as follows.

(I) The mounting structure reduces the angle between the door and video camera doorbell assembly. Thus, widening the viewing angle of the video camera doorbell assembly and improving the effectiveness of the video camera doorbell assembly.

(II) The bottom mounting holes are exposed for the operator to access with tools for mounting the angled mounting structure.

(III) The bottom holes are positioned to allow pass through of existing doorbell wiring.

(IV) The top surface provides mounting holes for a video camera doorbell assembly, with a center slot for pass through of wiring.

(V) The hollow center slot accommodates storage of excess wiring for a video camera doorbell assembly.

(VI) The top surface provides a wide mounting surface for water tight sealing of a video camera doorbell assembly gasket.

DETAILED DESCRIPTION OF THE INVENTION

The characteristics and technical contents of the present invention will be described with reference to the accompanying drawings. However, the drawings are illustrative only but not used to limit the present invention.

Figure 1:
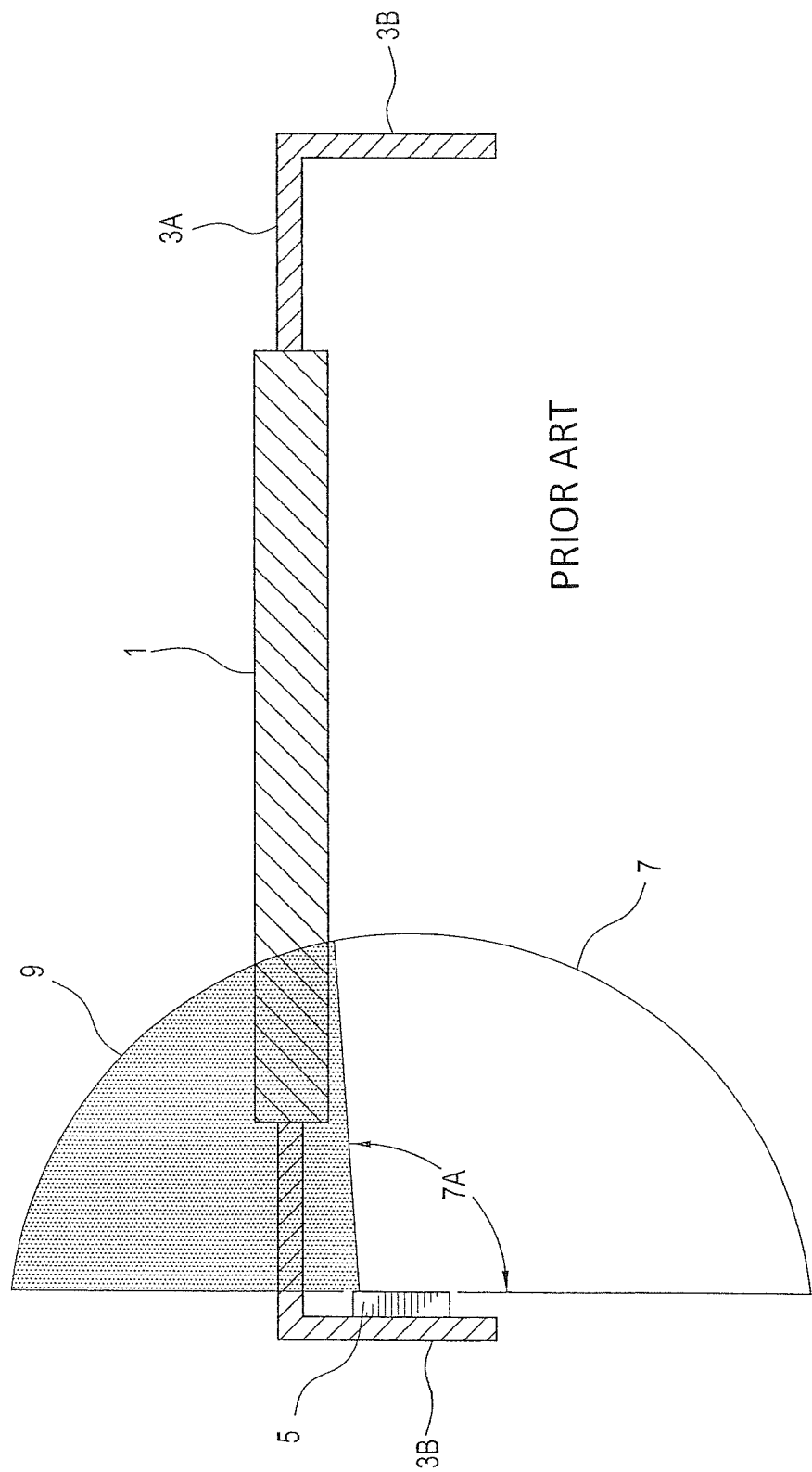
FIG. 1 is a top plan view of a known video camera doorbell assembly mounted on a frame of a doorway.

FIG. 1 is a diagram of a known video camera doorbell assembly 5 depicting the limitations of the video camera doorbell assembly's camera angle when mounted in a doorway.

Existing door 1 is surrounded by a frame 3 having a central position of 3A for mounting door 1 and a pair of opposed right angled portions 3B. When a conventional video camera doorbell assembly 5 is mounted perpendicular to the door 1 on either of positions 3B, the camera field of view 7, as indicated by angle 7A, of video doorbell assembly 5 becomes obstructed by the existing door 1 and frame 3A structures.

The usable video camera doorbell assembly camera field of view 7, as indicated by angle 7A, is reduced by about 90 degrees because of the obstructed view 9.

Figure 2:
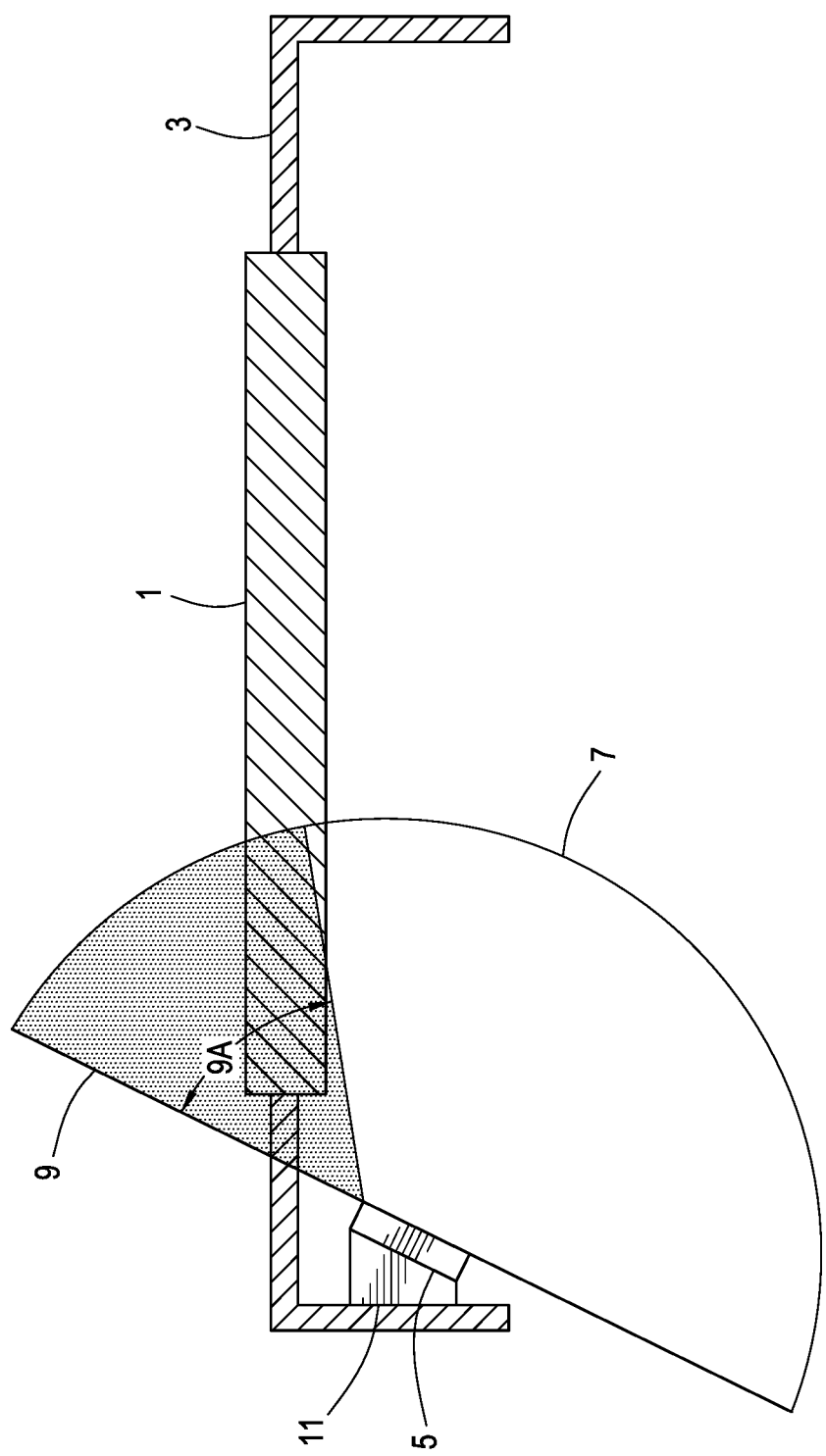
FIG. 2 is a top plan view of a known video camera doorbell assembly mounted on a frame of a doorway with the angled mounting structure of the present invention.

FIG. 2. is a diagram of the improved video camera doorbell assembly camera field of view when the present invention 11 is used.

When the video camera doorbell assembly 5 is attached to the angled mounting structure 11 of the invention, the video camera doorbell assembly's camera field of view 7 is expanded significantly to about 135 degree field of view by reducing the obstructed area 9 to a smaller angle 9A of about 45 degrees.

Figure 3:
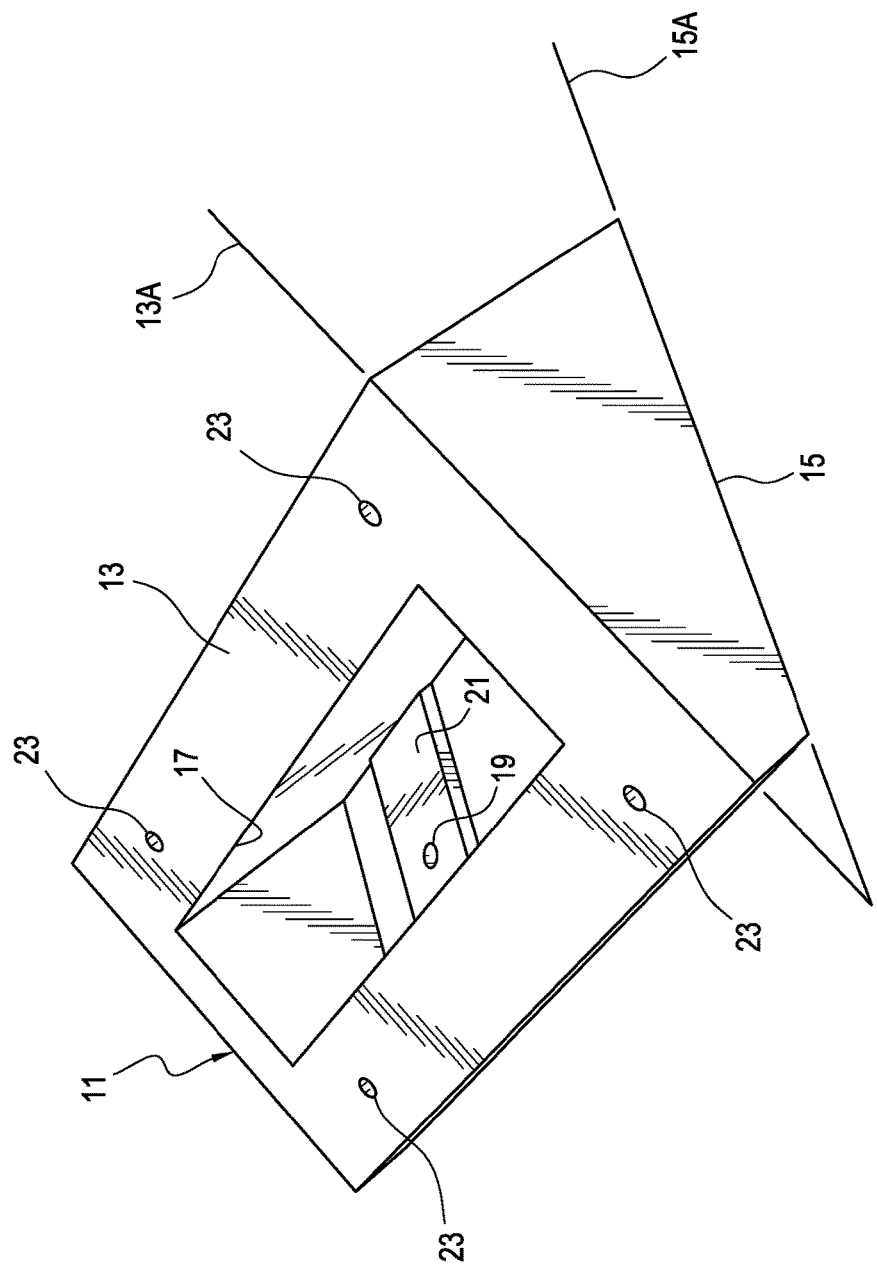
FIG. 3 is a front perspective view of the present invention.
Figure 4:
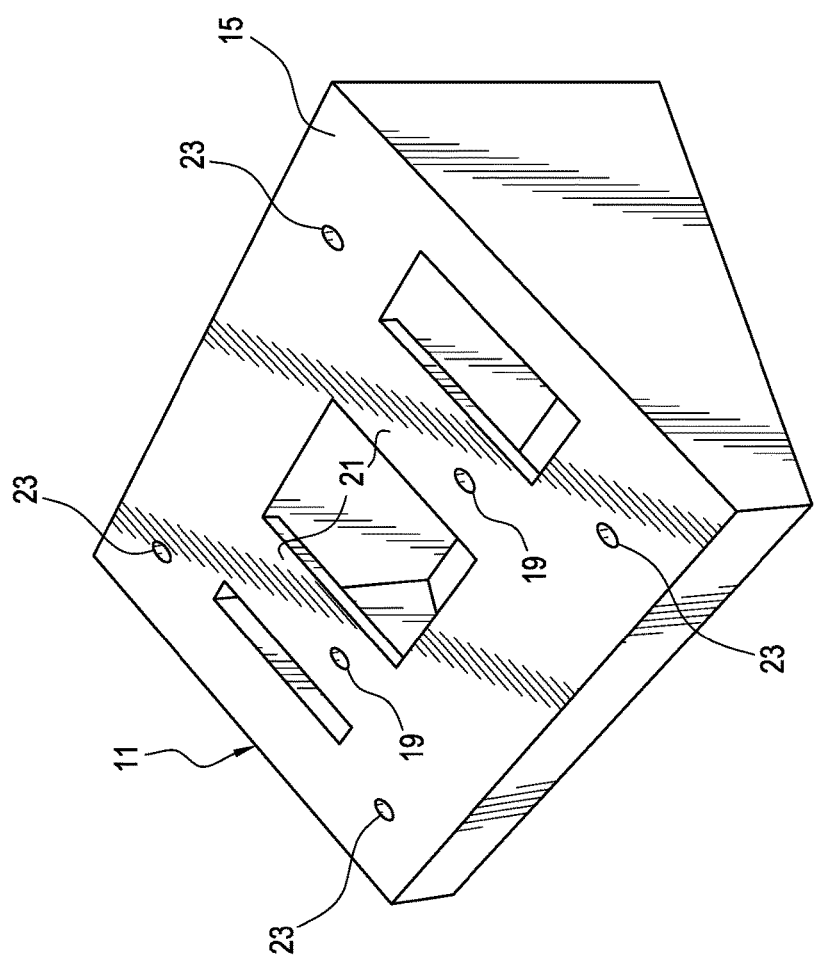
FIG. 4 is a rear perspective view of the present invention.

The angled mounting structure 11 of the present invention is shown in the respective front and rear perspective views of FIG. 3 and FIG. 4. Structure 11 includes a front surface 13 and a rear surface 15 which are non-parallel and define a pair of respective planes 13A and 15A which converge forwardly and diverge rearwardly when structure 11 is mounted on door frame 3, as shown in FIG. 2

Structure 11 includes a recess 17 formed therein for permitting access of a tool, such as a screw driver, to secure structure 11 to frame by means of screws or other appropriate fasteners which extend though holes 19 provided in mounting straps 21 forming part of rear surface 15. Recess 17 also serves the function of storing existing electrical wiring of video doorbell assembly 5.

Structure 11 further includes a plurality of fastener holes 23 which may extend either partially or completely through structure 11 from front surface 13 to rear surface 15 to receive screws or similar fasteners for attaching video doorbell assembly 5 to front surface 13 of structure 11.

As can be seen in FIG. 2, when structure 11 is mounted to either portion 3B of door frame 3, back surface 15 is parallel to and disposed in engagement with the corresponding mounting surface 3B of frame 3, while front surface 13 is angled outwardly to significantly expand the camera viewing angle of video doorbell assembly 5.

The invention claimed is:

1. In a combination of a video camera assembly mounted to a right angled portion of a door frame, the improvement comprising a support structure including a back surface engaging the right angled portion of the door frame and a front surface on which the video camera assembly is mounted, wherein the back and front surfaces define non-parallel planes which diverge in a rearward direction and converge in a forward direction.

2. The combination of claim 1, wherein the support structure further includes a mounting means for securing the back surface to the door frame.

3. The combination of claim 1, wherein the support structure further includes a recess for storing existing electrical wire and accessing the mounting means.

4. The combination of claim 1, wherein the support structure further includes means for attaching the video camera to the front surface.

* * * * *